(12) United States Patent
Piersol

(10) Patent No.: US 6,314,502 B1
(45) Date of Patent: Nov. 6, 2001

(54) METHOD AND APPARATUS FOR OPPORTUNISTIC QUEUE PROCESSING

(75) Inventor: Kurt Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/191,149

(22) Filed: Nov. 12, 1998

(51) Int. Cl.[7] ................................................. G06F 12/16

(52) U.S. Cl. ........................... 711/162; 709/203; 710/52; 710/39

(58) Field of Search ................................. 711/161, 162; 710/39, 52; 709/203

(56) References Cited

U.S. PATENT DOCUMENTS

| | | |
|---|---|---|
| 5,222,234 | 6/1993 | Wang et al. . |
| 5,535,381 * | 7/1996 | Kopper ................................. 710/52 |
| 5,572,583 | 11/1996 | Wheeler, Jr. et al. . |
| 5,708,810 | 1/1998 | Kern et al. . |
| 5,742,816 | 4/1998 | Barr et al. . |
| 5,749,083 | 5/1998 | Koda et al. . |
| 5,793,498 | 8/1998 | Scholl et al. . |
| 5,845,304 | 12/1998 | Iijima . |
| 5,848,410 | 12/1998 | Walls et al. . |
| 5,861,959 | 1/1999 | Barak . |
| 5,880,855 | 3/1999 | Ishikawa . |
| 5,905,980 | 5/1999 | Masuichi et al. . |
| 5,907,837 | 5/1999 | Ferrel et al. . |
| 5,923,845 | 7/1999 | Kamiya et al. . |
| 5,926,836 * | 7/1999 | Blumenau ........................... 711/162 |
| 5,946,701 | 8/1999 | Hamada . |
| 5,951,694 * | 9/1999 | Choquier et al. ...................... 714/15 |
| 6,038,379 * | 3/2000 | Fletcher et al. ................... 395/200.6 |
| 6,044,443 * | 3/2000 | Kim ..................................... 711/154 |

OTHER PUBLICATIONS ftp://ftp.isi.edu/in–notes/rfc1034.txt, P. Mockapetris, "Domain Names–Concepts And Facilities", Web Site–Network Working Group, Obsoletes: RFCs 882, 883, 973, Pertinent pp. 1–42.

ftp://ftp.isi.edu/in–notes/rfc1035.txt, P. Mockapetris, "Domain Names–Implementation And Specification", Web Site–Network Working Group, Obsoletes: RFCs 882, 883, 973, Pertinent pp. 1–42.

RFC 2131, "Dynamic Host Configuration Protocol", Mar. 1997, Pertinent pp. 7–45.

D. Eastlake 3rd CyberCash, Inc. Web Site–Network Working Group RFC 2137, Updates:1035, Category: Standards Track, "Secure Domain Name System Dynamic Update", Apr. 1997, Pertinent pp. 1–11.

P. Vixie, Edtor ISC, S. Thompson Bellcore, Y. Rekhter Cisco J. Bound DEC, Web Site–Network Working Group RFC 2136, Updates: 1035, Category: Standards Track, "Dynamic Updates in the Domain Name System (DNS Update)", Pertinent pp. 1–26.

RFC 2131, "Dynamic Host Configuration Protocol", Mar. 1997, Pertinent pp. 1–45.

J. Veizades @Home Network E. Guttman, C. Perkins, Sun Microsystems S. Kaplan, Web Site–Network Working Group, RFC:2165, Category: Standards Track, "Service Location Protocol", Jun. 1997, Pertinent pp. 1–72.

J. Reynolds, J. Postel, Web Site–Network Working Group, RFC 1700, STD:2, Obsoletes RFCs: 1340,1060,1010,990, 960,943,923,900,870,820,,790,776,770,762,758,755,750, 739,604,503,433,349,Obsoletes IENs: 127,117,93, Category: Standards Track, "Assigned Numbers", Oct. 1994, Pertinent pp. 1–230.

* cited by examiner

Primary Examiner—Hiep T. Nguyen
(74) Attorney, Agent, or Firm—Blakely, Sokoloff, Taylor & Zafman LLP

(57) ABSTRACT

A method and apparatus for asynchronously sharing a networked backup device among multiple users. A series of processes opportunistically perform operations, broadcast requests for physical media based upon the operations, and provide a series of canceling and status checking interfaces for users.

26 Claims, 7 Drawing Sheets

| | Process Request | File Name | Removable Medium |
|---|---|---|---|
| 375 | Backup | ABC | CD-ROM #3 |
| 377 | Backup | CDE | CD-ROM #2 |
| 379 | Backup | EFG | CD-ROM #3 |
| 381 | Restore | GHI | CD-ROM #5 |
| 383 | Backup | IJK | CD-ROM #7 |
| 385 | Expunge | KLM | CD-ROM #2 |
| 387 | Backup | MNO | CD-ROM #3 |

*FIG. 3b*

| FILE NAME | CREATION DATE | DATE LAST ACCESSED | # TIMES ACCESSED |
|---|---|---|---|
| 405 FILE ONE | 1/1/93 | 6/30/98 | 7 |
| 410 FILE TWO | 2/1/94 | 8/30/98 | 9 |
| 415 FILE THREE | 3/1/95 | 5/30/98 | 33 |
| 420 FILE FOUR | 4/1/96 | 4/30/98 | 22 |
| 425 FILE FIVE | 5/1/97 | 7/30/98 | 11 |

FIG. 4

METHOD AND APPARATUS FOR OPPORTUNISTIC QUEUE PROCESSING

FIELD OF THE INVENTION

The present invention relates to data processing; more specifically, the present invention relates to asynchronous processing of electronic documents within a data backup and retrieval system.

BACKGROUND OF THE INVENTION

With the proliferation of digital computers throughout society, it has become increasingly important to ensure the integrity and longevity of electronic data created on those computers. Data backup systems, which typically copy electronic data or files from one storage media to another, have traditionally been used as one way of preserving such electronic data.

As beneficial as current data backup systems may be, they do have some limitations. In a small office environment, for example, there is typically one individual who is assigned the duty of creating backup copies of files and documents (i.e., performing "backups"). This individual may be responsible for scheduling the backups, inserting the correct secondary storage media into the backup device, or performing any other managerial tasks related to the backup or restore process. Furthermore, the individual who performs the backups is often the only person who has the capability of canceling, modifying, or fulfilling user backup and restore requests. One problem with such an arrangement is the reliance upon any one individual to perform the majority of backup and restore operations. If that particular individual was unavailable, user backup and restore requests could go ignored, thereby endangering data integrity and potentially decreasing productivity.

Another limitation with existing data backup systems lies within how the backup systems operate. Typically, users will request that particular data be backed up to or restored from a secondary storage media. The time required to fulfill such a request may vary depending upon the complexity of the request. If a request requires a secondary storage media different from that which is present in the backup device, the operator must first locate the appropriate secondary storage media and thereafter insert the media into the backup device. Any delays experienced may be compounded when multiple users concurrently share a single backup device, each issuing simultaneous backup or restore requests to the same device. In such a case, the requests are typically honored on a first come, first served basis. One problem with this method of data backup management is the sequential nature of which the backup and restore requests are handled. If, for instance, a user requests that data be restored from an non-locatable secondary media, subsequent user requests will be delayed until that secondary media is located and inserted into the backup device. Moreover, there will often be only one individual assigned the task of locating and inserting such secondary media.

Therefore, what is needed is a method and apparatus for receiving asynchronous data backup related requests from multiple users and opportunistically managing those requests automatically so that data is transferred as the necessary media becomes available rather than in an inflexible first in/first out (FIFO) manner.

SUMMARY OF THE INVENTION

A data backup and retrieval system and method are described. The system includes a first data storage device and a second device. The first data storage device has a removable storage medium, while the second device, coupled to the first data storage device, comprises a process queue for opportunistically managing multiple data processing requests.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3B illustrates a chart listing multiple data processing requests and the corresponding removable mediums to which they are directed.

FIG. 4 illustrates a chart listing multiple data files along with corresponding creation and access information.

DETAILED DESCRIPTION OF THE PRESENT INVENTION

Figure 1:
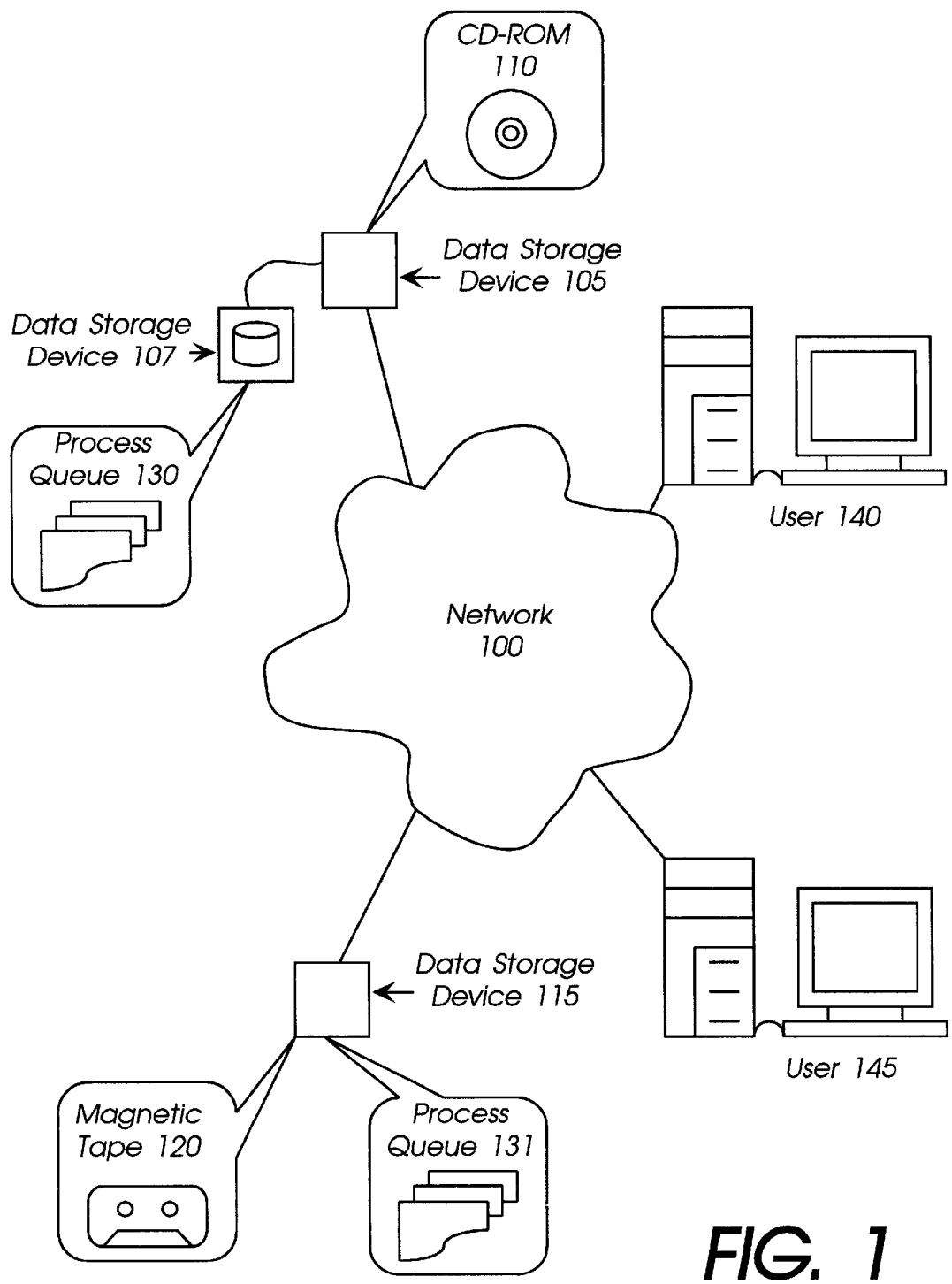
FIG. 1 is a block diagram of one embodiment of an opportunistic data backup and retrieval system.

An opportunistic backup/retrieval method and system are disclosed. The backup device is a networked backup device that is asynchronously shared among multiple users (i.e., operates in an asynchronously shared mode). Additionally, this backup and retrieval system operates in an opportunistic manner where user data processing requests, such as backup, restore, and expunge, are fulfilled in a non-fixed order. A series of queries, one for each operation, and a series of processes monitor the backup device and perform the operations. A status mechanism broadcasts requests for the recording media of the backup device based on the queued operations. Moreover, the system is capable of detecting which requests may be fulfilled using the recording medium existing in a data storage device and alternatively detects which recording medium should be inserted into a data storage device in order to fulfill any remaining processing requests.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Although all or some of the operations may be performed by software executing on one or more processing devices (e.g., CPUs), on a computer system or specialized apparatus, some or all of these operations may be performed by digital logic and/or circuitry, an integrated circuit (e.g., ASIC) or other semiconductor substrates.

System Overview

FIG. 1 illustrates one embodiment of a system having a networked backup device. Referring to FIG. 1, users 140 and 145 represent users of general purpose digital computers that are coupled to network 100. Network 100 may represent a local area network (LAN), an intranet, the Internet, or any other interconnected data path across which multiple devices may share information. Also coupled to network 100 is data storage device 105 containing removable recording medium CD-ROM 110. Data storage device 105 is coupled to data storage device 107 containing process queue 130. In one embodiment, data storage device 107 contains a non-removable storage medium such as a fixed or hard disk drive. In another embodiment, data storage device 107 may be a non-volatile memory device capable of storing information. In an alternative embodiment, data storage device 115, containing a removable storage medium, such as magnetic tape 120, and process queue 131 is connected to network 100. In another embodiment, the removable storage device contained in data storage device 115 comprises any removable storage medium in which data may be written to and read from.

The process queue 130 and data storage device 107 may be part of a file management system that includes a number of simultaneously executed daemons that operate on a set of documents. Various daemons included in the device form processing queues for these documents. Each queue is formed using simple files and standard directories, such as the Unix files and standard Unix directories. Each of these queues is designed to inform a daemon of the presence of documents for processing. In one embodiment, a daemon is a program that runs in the background by itself without any user intervention.

Figure 1A:
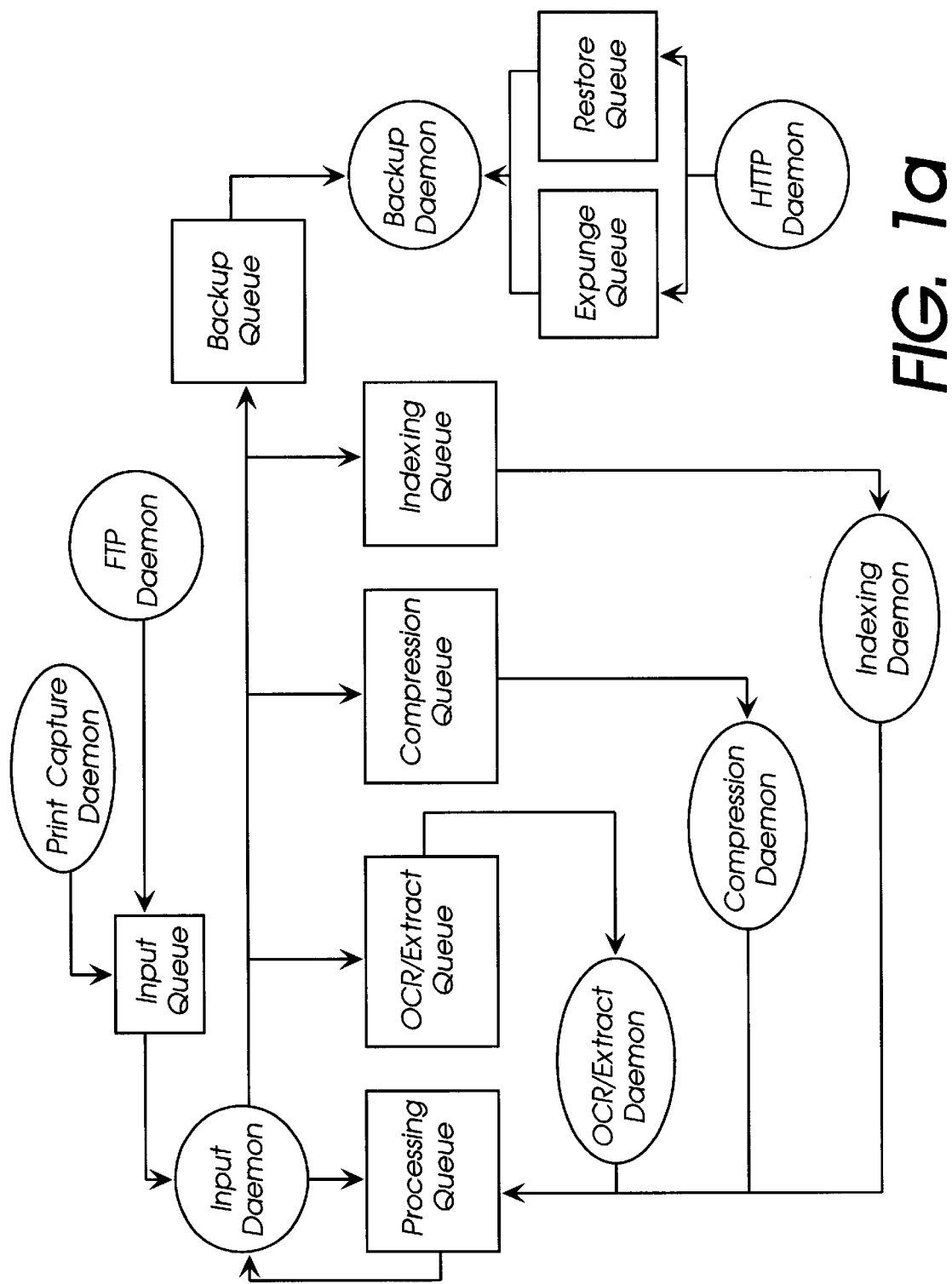
FIG. 1A illustrates document flow between daemons and queues.

One embodiment of document flow between daemons and queues are shown in FIG. 1A. Referring to FIG. 1A, an input daemon, FTP daemon, OCR/extract daemon, compression daemon, index daemon, backup daemon, HTTP daemon, and a print capture daemon, all coupled together using a series of queues. The input daemon is a data capture manager that manages the initial processing of each document captured by the file management system. Primarily, the input daemon monitors two queue directories, one for an input queue and one for the processing queue, and invokes processing tasks on the contents of the two directories. The input queue is filled with document directories by the FTP daemon, which provides a capture interface for the file management system, or the printer capture daemon, which captures the copy of each print job transparently to the job being printed. The input daemon notices these documents and moves them to the processing queue. While documents remain in the processing queue, the input daemon periodically checks the documents to determine if another task can be invoked.

When the input daemon invokes a task, it forwards a document from the processing queue to either the compression queue, indexing queue, OCR/extract queue, or the backup queue. The compression queue feeds the document to the compression daemon, which attempts to compress document content files in order to save space and forwards the compressed document to the processing queue. In one embodiment, the compression daemon may compress raw bit maps using MMR compression while compressing other content files using a zip format. The indexing queue feeds the document to the indexing daemon, which performs indexing and subsequently forwards the indexed document back to the processing queue. The OCR and text extraction queue feeds documents to the OCR/Extract daemon, which performs OCR on text and extracts image data from the document. Subsequently, the OCR/Extract daemon forwards the processed document to the processing queue.

The backup queue is file that represents a list of documents that need to be backed up by the file management system. The backup queue is shared by many processes. The backup daemon is coupled to the backup queue and performs a number of functions related to backup, document retention from backup, document expunging and index file management. In one embodiment, the backup daemon is implemented as several distinct processes. One process manages the actual backup activity. Another process manages asynchronous restoration for documents, and a third process manages the asynchronous expunging of documents.

Between the backup daemon and the HTTP daemon are a restoration queue and an expunge queue. The restoration queue represents a list of documents that need to be restored to the hard disk by the device. The expunged queue represents a list of documents that need to be expunged by the device.

The HTTP daemon provides web interfaces (e.g., pages) to show documents and/or status of documents in the expunged and restoration queues.

Figure 2:
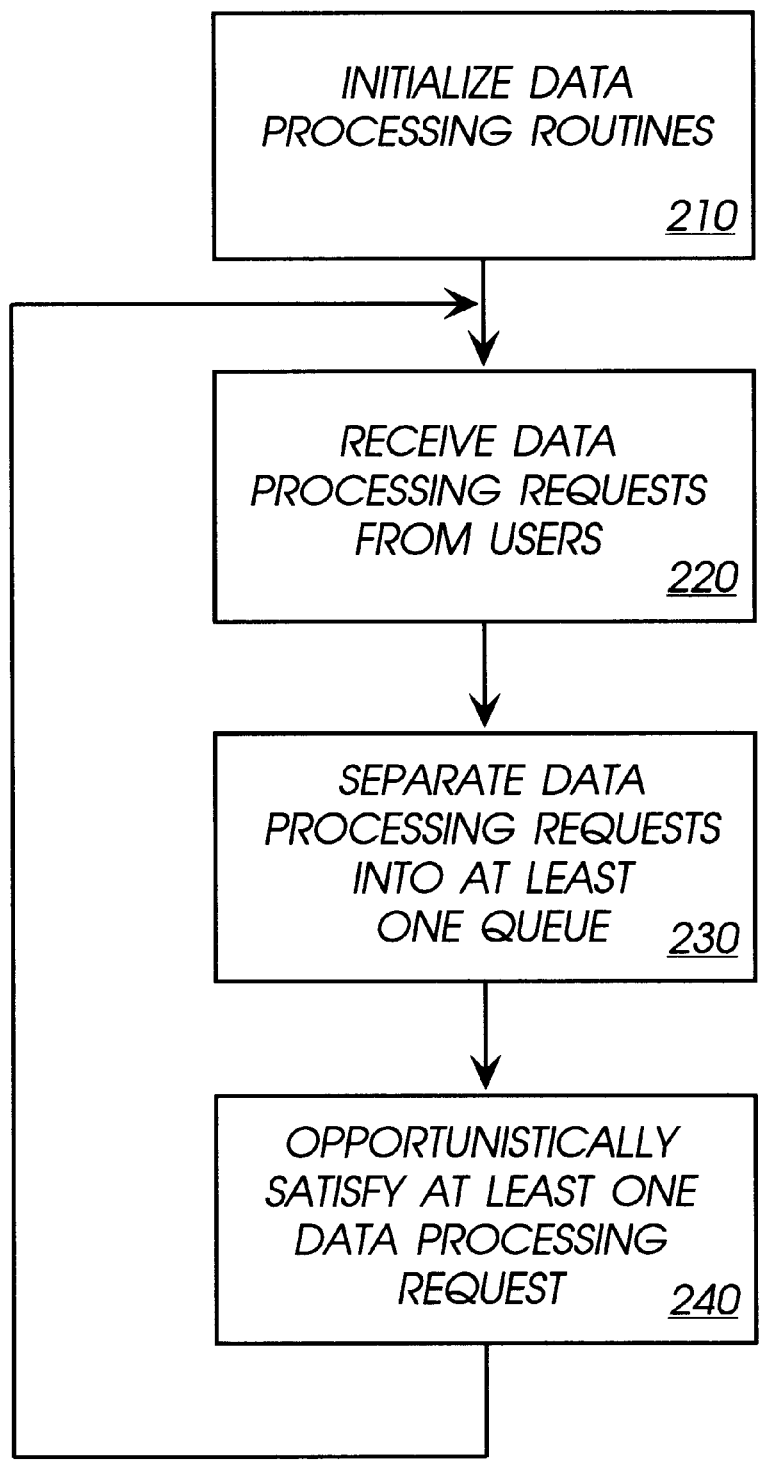
FIG. 2 is a flow diagram of one embodiment of a process for opportunistically managing asynchronous data.

In one embodiment, a backup daemon performs a number of functions related to data backup, data restoration from backup, and data expunging. FIG. 2 is a flow diagram of one embodiment of a process for opportunistically managing such data requests asynchronously received from multiple users 140 and 145. This process is performed by processing logic in the file management system and may comprise software executing on a dedicated or general purpose computer system or machine, may comprise dedicated hardware, or a combination of both.

Referring to FIG. 2, processing logic initializes data processing routines that are implemented as part of the backup daemon (processing block 210). In one embodiment, the data processing routines initialized include a backup routine, a restoration routine, an expunge routine, and a space recovery routine. Once initialized, the routines run as background processes and await further activity such as user requests.

Next, data backup request, data restore from backup request, and data expunge request are received from at least one of users 140 or 145 (processing block 220). One or more of these requests may be received at any one time. As the backup, restoration, and expunge processing requests are received, processing logic separates the requests into at least one process queue 130 and 131 (processing block 230). In one embodiment, the processing requests are separated into the backup queue, the restoration queue, and the expunge queue. Once the data processing requests are received and queued, processing logic opportunistically satisfies one or more such requests (processing block 240) and then loops back to processing block 220 to await further user requests.

Figure 3A:
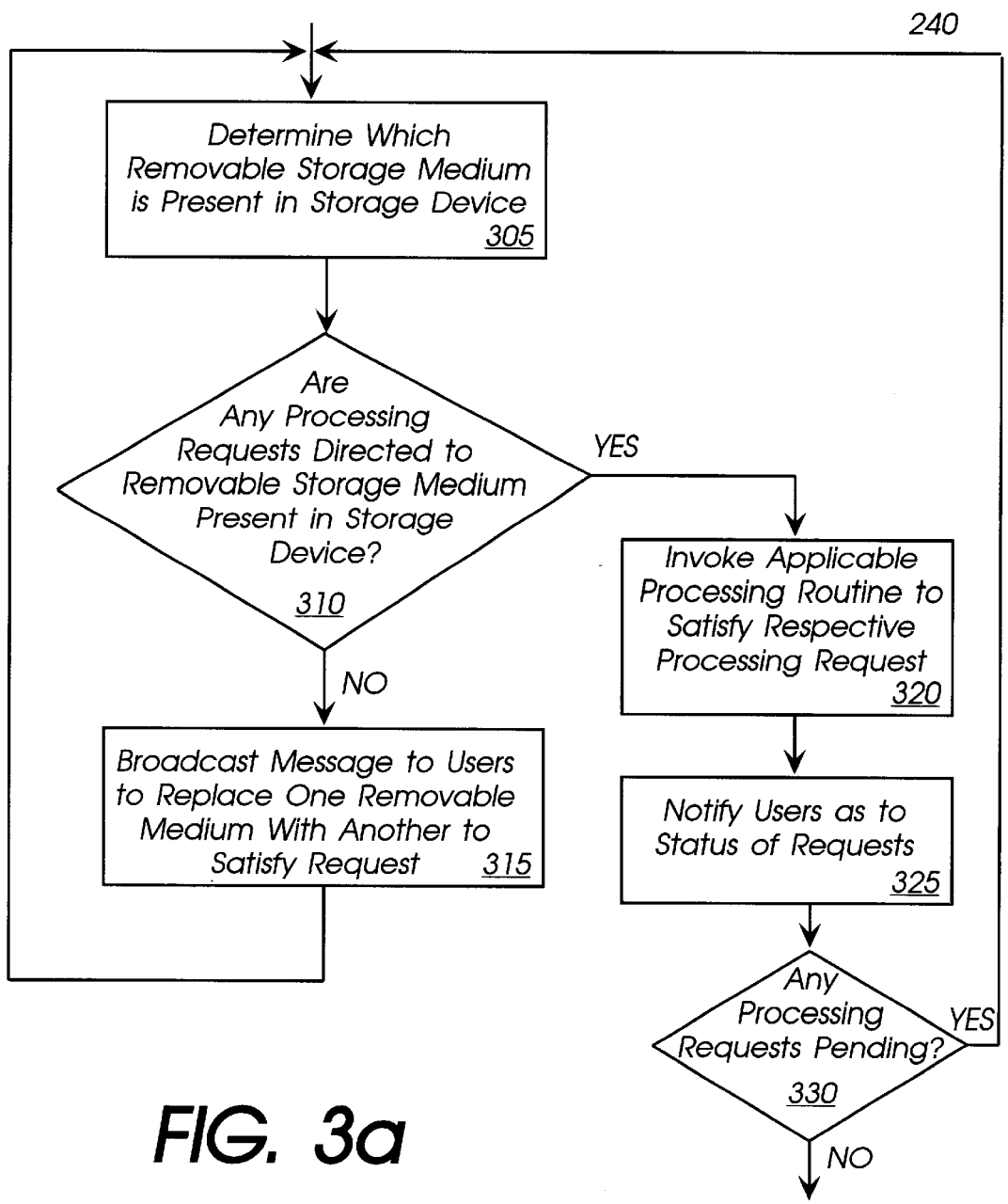
FIG. 3A is a flow diagram of one embodiment of a process for opportunistically satisfying a data processing request.

FIG. 3A is a flow diagram of one embodiment of a process for opportunistically satisfying at least one data processing request as described above with respect to processing block 240 of FIG. 2. Processing logic, as described above, performs the process shown in FIG. 3A.

Referring to FIG. 3A, initially, processing logic determines which removable storage medium is present in data storage device 105 (processing block 305). In one embodiment, CD-ROM 110 is present in data storage device 105; in other embodiments, any one of multiple CD-ROMs may be present in data storage device 105. Since the data stored on each different recording medium may vary, it is important to be able to identify and track which particular recording medium is present in data storage device 105 at any particular point in time. In one embodiment, removable recording mediums are assigned an identification (ID) code which is detected once the recording medium is inserted into the data storage device. In one embodiment, a label is written on the recording medium which may be read for identification.

Once the identity of the removable storage medium in data storage device 105 is ascertained, processing logic determines whether any data processing requests are directed to the removable storage medium present in data storage device 105 (processing block 310). If none of the processing requests are directed to the removable storage medium present in data storage device 105, processing logic causes the file management system to broadcast a message to users requesting that the current removable storage medium be replaced with a different removable storage medium (processing block 315). In one embodiment, the message is displayed to users 140 and 145 through a graphical user interface.

In one embodiment, the medium is requested based on a heuristic that determines which medium is the most "valuable" to process next. The criteria for determining whether a medium is valuable may include which medium has the most pending data processing requests waiting or which medium has the highest priority. The criteria may vary for different embodiments.

Once the storage medium has been replaced, processing logic loops back to determine which removable storage medium has been inserted (processing block 305) before determining the existence of applicable processing requests directed to the new recording medium (processing block 310). Note that in one embodiment, the user, and not the system, chooses which medium to insert.

If processing logic determines that there is at least one processing request present in process queue 130 that is directed to the newly inserted removable medium present in the data storage device 105, processing logic invokes an applicable processing routine to satisfy the request (processing block 320). As discussed above, the applicable processing routines include backup, restore, and expunge routines.

Next, processing logic causes the system to notify at least one user as to the status of the processing requests (processing block 325). In one embodiment, a status message is broadcast to all users and may include information, such as, for example, a list indicating the number of processing requests remaining, the types of requests remaining, the originator of each request, which removable mediums should be inserted to satisfy each request, and/or which removable medium should be inserted next. In one embodiment, users 140 and 145 have the ability to cancel pending data processing requests displayed in the status message. In one embodiment, status messages are viewed and requests are canceled through a graphical user interface on the display screens of users 140 and 145.

After users are updated as to the status of the requests, processing logic checks for pending data processing requests (processing block 330). If additional requests remain, processing logic returns the system to processing block 305 in order to determine which removable medium is present in data storage device 105. Processing logic then tests whether any additional processing requests remain (processing block 330); however, the file management system returns to wait for additional user input.

FIG. 3B illustrates by way of example a chart listing multiple data processing requests and the corresponding removable mediums to which they are directed. Referring to FIG. 3B and the process described in conjunction with FIG. 3A, if it is determined that CD-ROM #2 is present in data storage device 105, then processing logic determines that additional processing requests directed to CD-ROM #2 exist. Based on this determination, either the process request at line 377 or line 385 of FIG. 3B is invoked. The file management system examines the remaining requests and, after determining that at least one additional request remains pending, determines that one processing request directed to CD-ROM #2 remains. Subsequently, the remaining process request directed to CD-ROM #2 is invoked, and users are updated regarding the status of pending. Once it is determined that additional processing requests are pending, and no additional processing requests are directed to CD-ROM #2, the system broadcasts a message requesting that a new removable medium be inserted into data storage device 105. In the example shown in FIG. 3B, processing logic causes the system to request that CD-ROM #3, #5, or #7 be inserted into data storage device 105. Once the removable medium is replaced, the process of opportunistically managing the requests begins again.

Figure 3C:
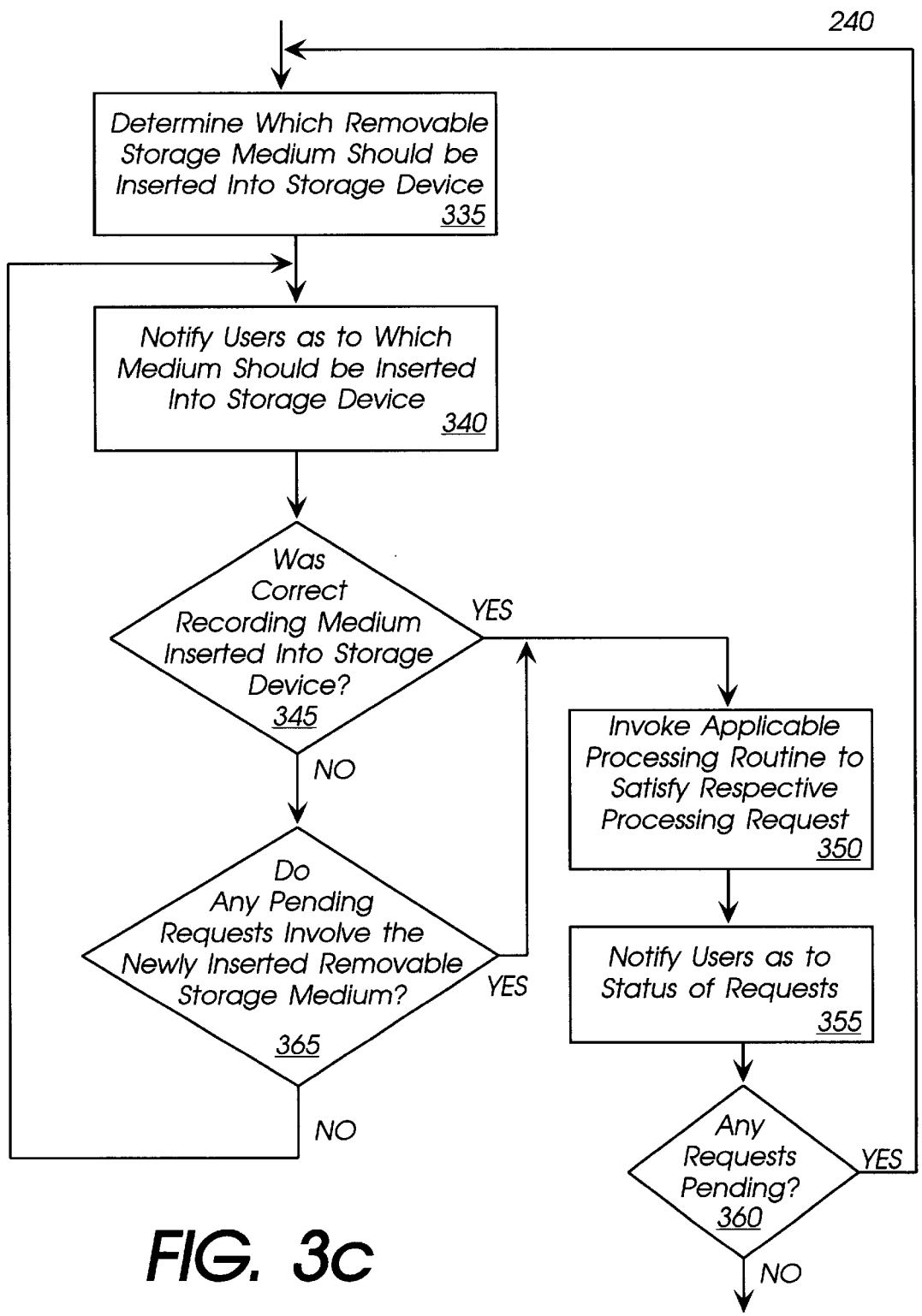
FIG. 3C is a flow diagram of an alternative embodiment of a process for opportunistically satisfying a data processing request.

FIG. 3C illustrates a flow diagram of an alternative embodiment of a process for opportunistically satisfying at least one data processing request as shown in step 240 of FIG. 2. Referring to FIG. 3C, processing logic is in the file management system makes a determination as to which removable storage medium should be inserted into data storage device 105 (processing block 335). In one embodiment, determination is made by analyzing pending data processing requests along with their respective removable recording mediums. In one embodiment, the removable storage medium with the greatest number of pending data processing requests is selected for insertion into data storage device 105.

Next, processing logic notifies at least one user as to which removable storage medium should be inserted (processing block 340). In one embodiment, processing logic broadcasts the notification to all users by way of a graphical user interface such as a web browser. After broadcasting the notification, processing logic determines whether at least one user inserted the correct removable recording medium into data storage device 105 (processing block 345). If the correct removable recording medium was not inserted, or the medium was not changed, there may still be pending requests directed to the medium present in the data storage device.

Processing logic checks whether any processing requests are pending for the removable recording medium that was inserted into data storage device 105 (processing block 365). If there are no processing requests pending for the newly inserted removable recording medium, processing loops back to notify users as to which medium should be inserted. If, however, there are processing requests pending for the newly inserted removable recording medium, or alternatively, the correct removable recording medium was inserted, processing logic invokes an applicable processing routine to satisfy a respective request (processing block 350). In one embodiment, if the processing request is a backup request, the backup routine is invoked.

Processing logic then notifies at least one user as to the status of the remaining requests (processing block 355). In one embodiment, such a status message is broadcast to all users and may include a list indicating the number of processing requests remaining, the types of requests remaining, the originator of each request, which removable mediums should be inserted to satisfy each request, and which removable medium should be inserted next. In one embodiment, users 140 and 145 have the ability to cancel pending data processing requests displayed in the status message. In one embodiment, status messages are viewed and requests are canceled through a graphical user interface on the display screens of users 140 and 145.

After users are updated as to the status of the requests, the system checks whether there are any further processing request, processing logic checks whether there are any further processing requests pending (processing block 360). If additional processing requests are pending, processing logic determines from those remaining requests which removable recording medium should be inserted (processing block 335). If no processing requests are pending, processing returns to wait for additional user input at processing block 220 of FIG. 2.

If, by way of example, the data listed in FIG. 3B is used in conjunction with the process embodied in FIG. 3C, it is determined at step 335 that CD-ROM #3 should be inserted into data storage device 105. Lines 375, 379, and 387 indicate that three process requests are directed to CD-ROM #3, whereas all other CD-ROMs have fewer pending requests. Since CD-ROM #3 has the most pending process requests directed to it, processing logic in the file management system determines CD-ROM #3 should be inserted into data storage device 105. After the system notifies users that CD-ROM #3 should be inserted into data storage device 105, the system confirms that CD-ROM #3 was in fact inserted. If CD-ROM #1 was inserted in lieu of CD-ROM #3, the system detects that no pending requests are directed to CD-ROM #1 and the system again notifies users to insert CD-ROM #3. If, however, processing logic determines that CD-ROM #5 was inserted into data storage device 105, processing logic knows that there is one pending request directed to CD-ROM #5 and proceeds to invoke the restoration routine. Processing logic then notifies users as to the status of the remaining data processing requests and recognizes that additional requests remain pending.

If CD-ROM #3 is correctly inserted, the backup routines of lines 375, 379, and 387 of FIG. 3B are invoked. Since data processing requests directed to CD-ROM #3 and #5 have been satisfied, the next CD-ROM to be requested is CD-ROM #2 shown in lines 377 and 385 of FIG. 3B, followed by CD-ROM #7 shown in line 383 of FIG. 3B.

The backup, restoration, and expunge routines each manipulate data in a slightly different manner. In one embodiment, the backup routine copies data from a non-removable or fixed data storage device, such as data storage device 107 in FIG. 1, to a data storage device having a removable recording medium similar to data storage device 105 and CD-ROM 110 in FIG. 1. In another embodiment, the backup routine copies data directly from user 140 or 145 to a data storage device 105 having a removable recording medium CD-ROM 110. In yet another embodiment, data storage device 105 having removable medium CD-ROM 110 is replaced by data storage device 115 with removable recording medium Magnetic Tape 120. In one embodiment, the backup routine may be run automatically as user backup requests are detected, or in an alternative embodiment the backup routine may be scheduled to run at specified time intervals. The time interval may be selected based on the type of backup device.

In one embodiment, the restoration routine copies data from a data storage device having a removable recording medium to a data storage device having a non-removable or fixed recording medium. Referring again to FIG. 1, in one embodiment, the restoration routine copies data from data storage device 105 having removable recording medium CD-ROM 110 to data storage device 107 having a non-removable or fixed recording medium such as a hard disk drive. In another embodiment, the restoration routine restores data directly from data storage device 105 having removable recording medium CD-ROM 110 to any user 140 and 145. In an alternative embodiment, data storage device 105 and removable recording medium CD-ROM 110 are replaced with data storage device 115 having removable recording medium Magnetic Tape 120.

In one embodiment, the space recovery routine is run so as to make additional data storage space available. In one embodiment, the space recovery routine detects when a threshold amount of data storage has been allocated on a data storage device, such as data storage device 107 in FIG. 1. In one embodiment, after detecting that a threshold amount of data storage has been allocated, the space recovery routine deletes the least recently accessed data from the data storage device.

FIG. 4 illustrates a chart listing multiple data files along with corresponding creation and access information. By way of example, if the space recovery routine were to be run on the files listed in FIG. 4, "filefour" on line 420 would be deleted. This is because filefour's "date last accessed" is listed as Apr. 30, 1998 thereby making filefour the least recently accessed file.

In one embodiment, the expunge routine deletes data from a particular removable storage medium. Referring to FIG. 1, user 140 could request that a particular file be expunged from CD-ROM 110. In an alternative embodiment, user 140 could request that a file be expunged from data storage device 107.

In one embodiment, the system includes multiple secondary storage devices. These secondary storage devices may be two or more CD recorders. In these embodiments, the backup, expunge and restore routines run against each such device.

Although the above has been described in terms of CD-ROMs, one or more of the storage mediums may be a DVD-ROM, DVD-RW and/or DVD-RAM. Such a system would then include the recorders and readers for using such devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a backup and retrieval system has been described.

I claim:

1. A data backup and retrieval system comprising:
   a first data storage device having a removable storage medium interface and one of a plurality of identified removable storage mediums arranged for use via the removable storage medium interface; and
   a second data storage device coupled to said first data storage device, said second data storage device further comprising a process queue configured to opportunistically manage a plurality of data processing requests to store data on one or more of the plurality of identified removable storage mediums, the second device to determine whether any of the data processing requests are destined for the removable storage medium arranged for use via the removable storage medium interface and to service the data processing requests destined for the removable storage medium arranged for use via the removable storage medium interface.

2. The system defined in claim 1 wherein the process queue further comprises:
   a backup queue to opportunistically manage data backup requests;
   a restoration queue to opportunistically manage restoration of previously backed up data; and
   an expunge queue to opportunistically manage expunging of data.

3. The system defined in claim 1 wherein said second data storage device further comprises a non-removable storage medium.

4. The system defined in claim 1 wherein said second data storage device further comprises a nonvolatile memory device.

5. The system defined in claim 1 wherein the removable storage medium comprises a medium in which data may be written to and read from.

6. The system defined in claim 5 wherein said removable storage medium comprises a CD-ROM.

7. The system defined in claim 5 wherein said removable storage medium comprises a DVD-ROM.

8. The system defined in claim 5 wherein said removable storage medium comprises a DVD-RW.

9. The system defined in claim 5 wherein said removable storage medium comprises a DVD-RAM.

10. The system defined in claim 5 wherein said removable storage medium comprises a magnetic tape.

11. The system defined in claim 1 further comprising a graphical user interface accessible across a network.

12. The system defined in claim 11 wherein the graphical user interface comprises:
    a first interface by which at least one user may monitor the status of the plurality of data processing requests; and
    a second interface by which said at least one user may cancel the plurality of data processing requests.

13. A method of managing asynchronous data comprising:
    initializing a plurality of processing routines;
    receiving a plurality of data processing requests from at least one user;
    separating said plurality of data processing requests into at least one queue; and
    opportunistically satisfying at least one of said plurality of data processing requests wherein opportunistically satisfying at least one of said plurality of data processing requests includes detecting a first removable storage medium in a data storage device, identifying said first removable storage medium in said data storage device, determining if said at least one of said plurality of data processing requests is directed to said first removable storage medium in said data storage device, and invoking at least one of said plurality of processing routines if said at least one of said plurality of data processing requests is directed to said first removable storage medium in said data storage device.

14. The method defined in claim 13 wherein receiving a plurality of data processing requests from at least one user further comprises receiving said plurality of data processing requests over a network.

15. The method defined in claim 13 wherein separating said plurality of data processing requests into at least one queue further comprises:
    separating said data processing requests into a backup queue;
    separating said data processing requests into a restoration queue; and
    separating said data processing requests into an expunge queue.

16. The method defined in claim 13 wherein initializing a plurality of processing routines further comprises:
    initializing a backup routine wherein said backup routine transfers data from a first data storage device to a second data storage device having a removable storage medium;
    initializing a restoration routine wherein said restoration routine transfers data from said second data storage device having said removable storage medium to said first data storage device; and initializing an expunge routine wherein said expunge routine deletes data from said removable storage medium.

17. The method defined in claim 16 further comprising initializing a space recovery routine wherein said space recovery routine comprises:

detecting whether a threshold amount of data storage has been allocated on a first data storage device; and deleting the least recently accessed data from said first data storage device if said threshold amount of data storage has been allocated on said first data storage device.

18. The method defined in claim 13 wherein notifying said at least one user as to the status of said plurality of data processing requests further comprises alerting said at least one user to replace said first removable storage medium in said data storage device with a second removable storage medium.

19. A method of managing asynchronous data comprising:

initializing a plurality of processing routines;

receiving a plurality of data processing requests from at least one user;

separating said plurality of data processing requests into at least one queue; and opportunistically satisfying at least one of said plurality of data processing requests, wherein opportunistically satisfying at least one of said plurality of data processing requests includes determining a first removable storage medium that should be inserted into a data storage device to satisfy the greatest number of said plurality of data processing requests, notifying said at least one user to insert said first removable storage medium into said data storage device to satisfy said greatest number of said plurality of data processing requests, invoking at least one of said plurality of data processing routines after said at least one user inserts said first removable storage medium in order to satisfy said greatest number of said plurality of data processing requests, and notifying said at least one user as to the status of said plurality of data processing requests.

20. An article comprising a machine-readable medium having stored thereon sequences of instructions that, when executed, cause one or more processors to:

initialize a plurality of processing routines;

receive a plurality of data processing requests from at least one user;

separate said plurality of data processing requests into at least one queue; and opportunistically satisfy at least one of said plurality of data processing requests wherein opportunistically satisfying at least one of said plurality of data processing requests includes detecting a first removable storage medium in a data storage device, identifying said first removable storage medium in said data storage device, determining if said at least one of said plurality of data processing requests is directed to said first removable storage medium in said data storage device, and invoking at least one of said plurality of processing routines if said at least one of said plurality of data processing requests is directed to said first removable storage medium in said data storage device.

21. The article defined in claim 20 wherein receiving a plurality of data processing requests from at least one user further comprises receiving said plurality of data processing requests over a network.

22. The article defined in claim 20 wherein the sequences of instructions that cause the one or more processors to separate said plurality of data processing requests into at least one queue further comprises sequences of instructions that, when executed, cause the one or more processors to:

separate said data processing requests into a backup queue;

separate said data processing requests into a restoration queue; and separate said data processing requests into an expunge queue.

23. The method defined in claim 20 wherein the sequences of instructions that cause the one or more processors to initialize a plurality of processing routines further comprises sequences of instructions that, when executed, cause the one or more processors to:

initialize a backup routine wherein said backup routine transfers data from a first data storage device to a second data storage device having a removable storage medium;

initialize a restoration routine wherein said restoration routine transfers data from said second data storage device having said removable storage medium to said first data storage device; and initialize an expunge routine wherein said expunge routine deletes data from said removable storage medium.

24. The article defined in claim 23 further comprising sequences of instructions that, when executed, cause the one or more processors to initialize a space recovery routine by:

detecting whether a threshold amount of data storage has been allocated on a first data storage device; and deleting the least recently accessed data from said first data storage device if said threshold amount of data storage has been allocated on said first data storage device.

25. The article defined in claim 20 wherein the sequences of instructions that cause the one or more processors to notify said at least one user as to the status of said plurality of data processing requests further comprises sequences of instructions that, when executed, cause the one or more processors to alert said at least one user to replace said first removable storage medium in said data storage device with a second removable storage medium.

26. An article comprising a machine-readable medium having stored thereon sequences of instructions that, when executed, cause one or more processors to:

initialize a plurality of processing routines;

receive a plurality of data processing requests from at least one user;

separate said plurality of data processing requests into at least one queue; and opportunistically satisfy at least one of said plurality of data processing requests, wherein opportunistically satisfying at least one of said plurality of data processing requests includes determining a first removable storage medium that should be inserted into a data storage device to satisfy the greatest number of said plurality of data processing requests, notifying said at least one user to insert said first removable storage medium into said data storage device to satisfy said greatest number of said plurality of data processing requests, invoking at least one of said plurality of data processing routines after said at least one user inserts said first removable storage medium in order to satisfy said greatest number of said plurality of data processing requests, and notifying said at least one user as to the status of said plurality of data processing requests.

* * * * *